United States Patent
Slocum et al.

(10) Patent No.: US 8,668,230 B2
(45) Date of Patent: Mar. 11, 2014

(54) APPARATUS AND METHODS FOR SPLICING CONDUITS AND HOSES SUBSEA

(75) Inventors: Alexander Henry Slocum, Bow, NH (US); Luis Javier Gutierrez, Houston, TX (US)

(73) Assignee: BP Corporation North America Inc., Houston, TX (US)

( * ) Notice: Subject to any disclaimer, the term of this patent is extended or adjusted under 35 U.S.C. 154(b) by 151 days.

(21) Appl. No.: 13/454,593

(22) Filed: Apr. 24, 2012

(65) Prior Publication Data

US 2012/0319396 A1 Dec. 20, 2012

Related U.S. Application Data

(60) Provisional application No. 61/479,486, filed on Apr. 27, 2011.

(51) Int. Cl.
*F16L 21/06* (2006.01)
(52) U.S. Cl.
USPC ........................... 285/322; 285/243; 285/255
(58) Field of Classification Search
USPC .......... 285/322, 323, 324, 255, 102, 103, 243
See application file for complete search history.

(56) References Cited

U.S. PATENT DOCUMENTS

| 996,114 | A | * | 6/1911 | Muller | 285/243 |
| 3,097,866 | A | * | 7/1963 | Iversen | 285/322 |
| 3,222,091 | A | * | 12/1965 | Marshall | 285/243 |
| 3,393,926 | A | | 7/1968 | Arnold | |
| 4,049,297 | A | * | 9/1977 | Reneau | 285/322 |
| 4,712,813 | A | * | 12/1987 | Passerell et al. | 285/323 |
| 5,150,924 | A | * | 9/1992 | Yokomatsu et al. | 285/243 |
| 5,456,501 | A | | 10/1995 | Reaux | |
| 6,932,389 | B2 | * | 8/2005 | Robison | 285/322 |
| 8,157,294 | B2 | * | 4/2012 | Sisk | 285/243 |

* cited by examiner

*Primary Examiner* — David E Bochna
(74) *Attorney, Agent, or Firm* — Jayne C. Piana (57) ABSTRACT

A hose connection system comprises a body including an internal cavity and a port in fluid communication with a portion of the internal cavity. In addition, the system comprises a hose end fitting positioned in the cavity. The hose end fitting includes an inner tubular member and an outer tubular member concentrically disposed about the inner tubular member. The outer tubular member includes a plurality of circumferentially spaced axial slits. Further, the system comprises a plurality of wedge members arranged circumferentially about the outer tubular member. Still further, the system comprises an annular piston movably disposed within the internal cavity of the body. An end of the piston has an inner frustoconical surface that slidingly engages the plurality of wedge members. The piston is configured to move axially through the body and compress the wedge members and the outer tubular member radially inward.

19 Claims, 8 Drawing Sheets

APPARATUS AND METHODS FOR SPLICING CONDUITS AND HOSES SUBSEA

CROSS-REFERENCE TO RELATED APPLICATIONS

This application claims benefit of U.S. provisional patent application Ser. No. 61/479,486 filed Apr. 27, 2011, and entitled "Apparatus and Methods for Splicing Conduit Subsea," which is hereby incorporated herein by reference in its entirety.

STATEMENT REGARDING FEDERALLY SPONSORED RESEARCH OR DEVELOPMENT

This invention was made with Government support from the Department of Energy under Contract No. DE-FE0010426. The government may have certain rights in this invention.

BACKGROUND

1. Field of the Invention

The invention relates generally to apparatus and methods for connecting hoses and other fluid conduits. More particularly, the invention relates to apparatus and methods for splicing hoses and conduits in a subsea marine environment.

2. Background of the Technology

Hydraulically operated systems are deployed subsea to facilitate and support offshore drilling and production operations. The hydraulically operated system is often connected to a subsea hydraulic power source with a flexible hose that supplies hydraulic fluid pressure to operate the system. In some cases, it may be necessary to cut the hydraulic fluid supply hose to replace or repair the hydraulic power source or hydraulically operated system, and then reconnect the repaired or new power source with the hydraulic system. For example, referring now to FIGS. 1A-1C, upon failure of a subsea hydraulic power source 10, it is disconnected from a subsea hydraulically operated system 20 by cutting the hydraulic supply hose 30 extending therebetween. Cutting hose 30 results in a first hose segment 30a connected to system 20 and a second hose segment 30b connected to power source 10. Next, the non-functional power source 10 is retrieved to the surface for repair or replacement.

Figure 1A:
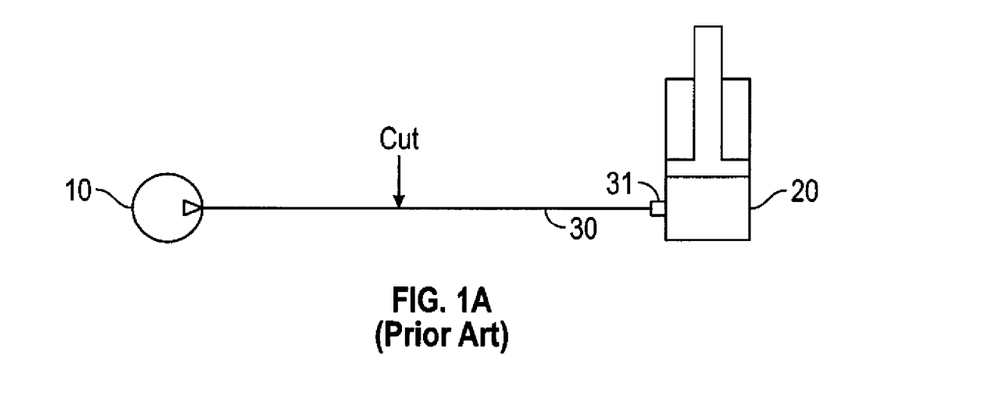
FIGS. 1A-1C are sequential schematic illustrations of a conventional method for reconnecting hose segments of a subsea hydraulic power source and a subsea hydraulic system.
Figure 1B:
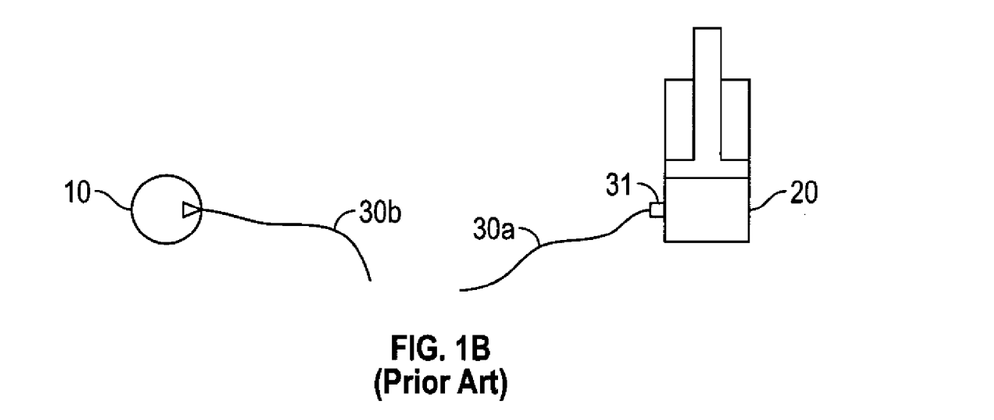
Figure 1C:
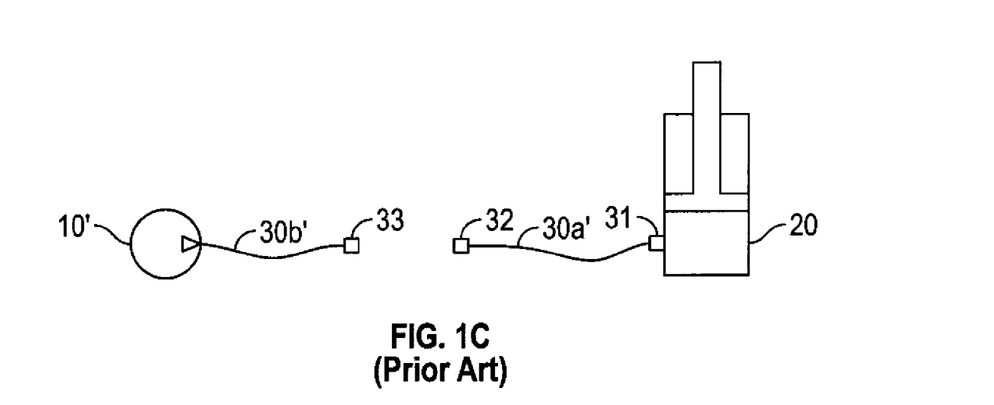

A repaired or new hydraulic power source 10' is then lowered subsea and reconnected to system 20 subsea using one or more remotely operated vehicles (ROVs). As best shown in FIGS. 1B and 1C, typically, the subsea ROVs remove hose segment 30a coupled to system 20 by disconnecting a connector 31 that couples hose segment 30a to system 20. Next, a replacement hose segment 30a' having a connector 31' at one end and a standard ROV male connector 32 at the opposite end is connected to system 20. The repaired or new hydraulic power source 10' is deployed with a hose segment 30b' with a standard ROV female connector 33 that releasably connects to connector 32, thereby fluidly coupling power source 10' to system 20.

This process enables repair or replacement of subsea hydraulic power source 10 without retrieving system 20 to the surface. However, before hose segments 30a', 30b' can be connected, hose segment 30a is removed and a new hose segment 30a' is connected to system 20. Accordingly, this process is often time consuming and challenging to perform with ROVs, particularly in deepwater environments.

Figure 2:
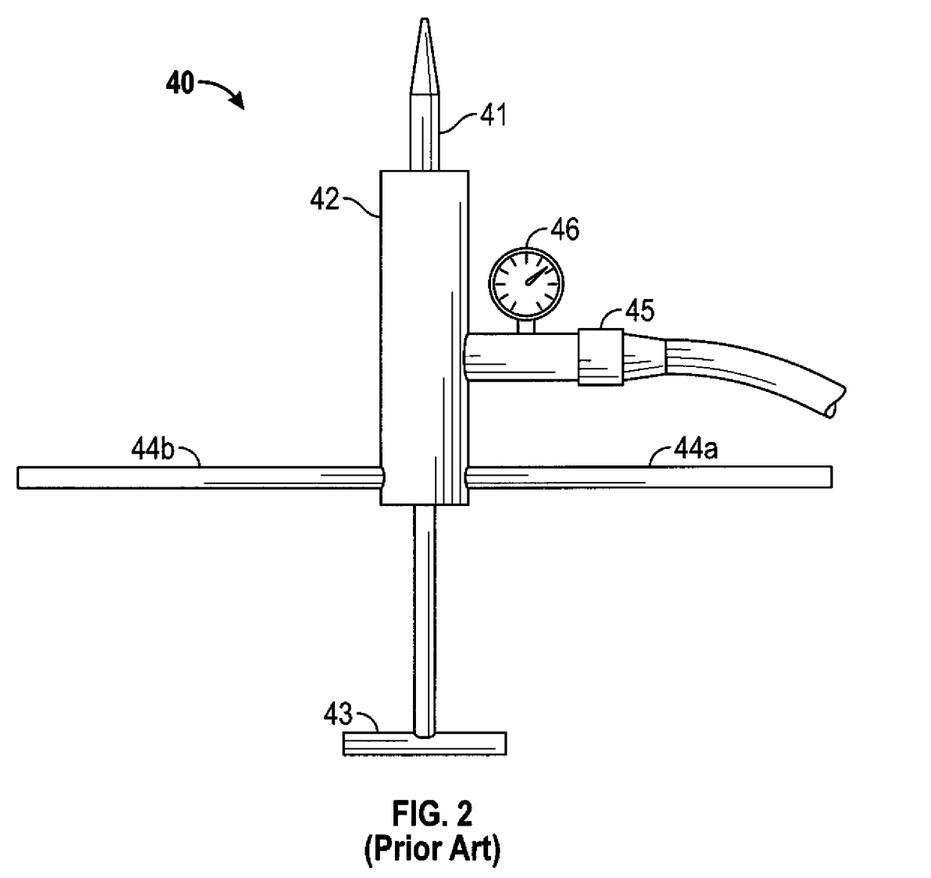
FIG. 2 is a front view of a conventional subsea hose splicing tool.

An alternative approach to connect two hose segments subsea (e.g., connect hose segments extending from a subsea hydraulic power source and a subsea hydraulic system) is to splice the hose segments together. Referring now to FIG. 2, a hose splicing or insertion tool 40 was developed by Oceaneering, Inc. of Houston, Tex. to connect severed hoses in an emergency situation. Tool 40 includes a conical hollow needle 41 and a cylindrical body 42 coupled to needle 41. A handle or paddle 43 extends from body 42 and is turned by a subsea ROV to engage seals inside body 42. Paddle 43 and a pair of arms 44a, 44b extending from body 42 allow an ROV operator to stab needle 41 into a first hose segment. Body 42 includes a connector 45 that allows connection of a second hose segment to tool 40. Fluid communication between the two hose segments connected to tool 40 is provided through connector 45, body 42, and needle 41. Fluid flow through tool 40 may be monitored with a pressure gauge 46 coupled to connector 45. However, the flow area through the needle is substantially less than that of the original hose, so the connection acts as a flow restrictor, thereby reducing the effectiveness of the spliced line. In addition, it is very difficult for an ROV operator to align the needle with the end of the hose and push the needle into the hose.

Accordingly, there remains a need in the art for apparatus and methods to repair and/or install subsea devices and systems that rely on hose or other conduit connections, establish ad hoc subsea hose connections, and repair damaged or severed subsea hoses. Such apparatus and methods would be particularly well-received if they were easily manipulated, installed, and visualized by one or more subsea ROVs; easily deployed from a surface vessel; and were capable of maintaining fluid flow rates and pressures substantially the same as the original subsea hose or conduit.

BRIEF SUMMARY OF THE DISCLOSURE

These and other needs in the art are addressed in one embodiment by a hose connection system. In an embodiment, the system comprises a body including an internal cavity and a port in fluid communication with a portion of the internal cavity. In addition, the system comprises a hose end fitting positioned in the cavity. The hose end fitting includes an inner tubular member configured to be stabbed into an end of a first hose and an outer tubular member concentrically disposed about the inner tubular member and configured to be disposed about the end of the first hose. The outer tubular member includes a plurality of circumferentially spaced axial slits. Further, the system comprises a plurality of wedge members arranged circumferentially about the outer tubular member. Still further, the system comprises an annular piston movably disposed within the internal cavity of the body. An end of the piston has an inner frustoconical surface that slidingly engages the plurality of wedge members. The piston is configured to move axially through the body and compress the wedge members and the outer tubular member radially inward to engage and lock in place the end of the first hose about the inner tubular member in response to hydraulic pressure in the port.

These and other needs in the art are addressed in another embodiment by a tool for connecting to a hose or conduit. In an embodiment, the tool comprises a housing having a central axis, a first end, a second end opposite the first end, a radially outer surface, and a radially inner surface. The housing includes a port extending radially through the housing from the outer surface to the inner surface. In addition, the tool comprises a guide member having a first end disposed within the housing, a second end opposite the first end, and a through passage extending axially from the first end of the guide member to the second end of the guide member. Further, the tool comprises an annular piston slidably disposed within the housing. The piston has a first end, a second end coupled to the first end of the guide member, a radially outer surface, and a through passage extending axially from the first end of the piston to the second end of the piston. The through passage of the piston includes a frustoconical surface extending axially from the first end of the piston, and the through passage of the piston is in fluid communication with the through passage of the guide member. Still further, the tool comprises an annular chamber within the housing in fluid communication with the port. Moreover, the tool comprises a hose end fitting disposed within the housing. The first hose end fitting includes a stabbing member and a shell disposed about the stabbing member. The tool also comprises a plurality of circumferentially spaced wedge members positioned between the housing and the shell of the hose end fitting. Each wedge member has a radially outer surface that mates and slidably engages the frustoconical surface of the piston.

These and other needs in the art are addressed in another embodiment by a system for connecting two hoses or conduits. In an embodiment, the system comprises a mandrel having a central axis, a first end, a second end opposite the first end, and a through bore extending axially from the first end to the second end. In addition, the system comprises a first hose attachment assembly mounted to the first end of the mandrel. Further, the system comprises a second hose attachment assembly mounted to the second end of the mandrel. Each hose attachment assembly includes a housing having a first end, a second end opposite the first end, and a port extending radially through the housing. Each hose attachment assembly also includes a guide member moveably coupled to the housing. The guide member has a first end, a second end opposite the first end, and a through passage extending axially from the first end of the guide member to the second end of the guide member. Still further, each hose attachment assembly includes an annular piston slidably within the housing. The piston has a first end, a second end coupled to the guide member, an outer surface, and a through passage extending axially from the first end of the piston to the second end of the piston. The through passage of the piston includes an annular tapered surface extending axially from the first end of the piston. The through passage of the piston is in fluid communication with the through passage of the guide member and the through bore of the mandrel. Moreover, each hose attachment assembly includes a hydraulic chamber positioned between the housing and the piston. The hydraulic chamber is in fluid communication with the port. Each hose attachment assembly also includes a hose end fitting disposed within the housing. The hose end fitting has a first end coupled to the first end of the mandrel and a second end disposed within the piston, and the hose end fitting includes a flow tube member and an annular shell disposed about the flow tube. Still further, each hose attachment assembly includes a plurality of circumferentially spaced wedge members radially disposed between the shell and the piston. Each wedge member has an outer surface that slidably engages the tapered surface of the piston and an inner surface that engages the shell.

These and other needs in the art are addressed in another embodiment by a method. In an embodiment, the method comprises (a) lowering a hose connecting tool subsea. The hose connecting tool comprises a mandrel having a central axis, a first end, a second end opposite the first end, and a through bore extending axially from the first end to the second end. The hose connecting tool also comprises a first hose attachment assembly mounted to the first end of the mandrel. In addition, the hose connecting tool comprises a second hose attachment assembly mounted to the second end of the mandrel. The method also comprises (b) inserting an end of a first hose segment into the first hose attachment assembly. Further, the method comprises (c) hydraulically actuating the first hose attachment assembly to secure the end of the first hose segment therein. Still further, the method comprises (d) inserting an end of a second hose segment into the second hose attachment assembly. Moreover, the method comprises (e) hydraulically actuating the second hose attachment assembly to secure the end of the second hose segment therein. The method also comprises (f) flowing fluid from the first hose segment through the first hose attachment assembly, the mandrel, and the second hose attachment assembly to the second hose segment.

These and other needs in the art are addressed in another embodiment by a method for replacing a first hydraulic power source connected to a hydraulic system with a hydraulic hose. In an embodiment, the method comprises (a) cutting the hydraulic hose into a first hose segment connected to the first subsea hydraulic power source and a second hose segment connected to the hydraulic system. In addition, the method comprises (b) deploying a second hydraulic power source subsea, the second hydraulic power source including a hydraulic fluid supply hose. Further, the method comprises (c) inserting an end of the hydraulic fluid supply hose into a first hose attachment assembly. Still further, the method comprises (d) hydraulically actuating the first hose attachment assembly to secure the end of the hydraulic fluid supply hose therein. Moreover, the method comprises (e) inserting an end of the first hose segment into a second hose attachment assembly. The method also comprises (f) hydraulically actuating the second hose attachment assembly to secure the end of the first hose segment therein. In addition, the method comprises (g) flowing fluid from the second hydraulic power source through the hydraulic supply hose, the second hose attachment assembly, the first hose attachment assembly, and the first hose segment to the hydraulic system.

Embodiments described herein comprise a combination of features and advantages intended to address various shortcomings associated with certain prior devices, systems, and methods. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. In addition, a "radially" outer or inner surface is a surface having a surface normal with a radial component.

Figure 3:
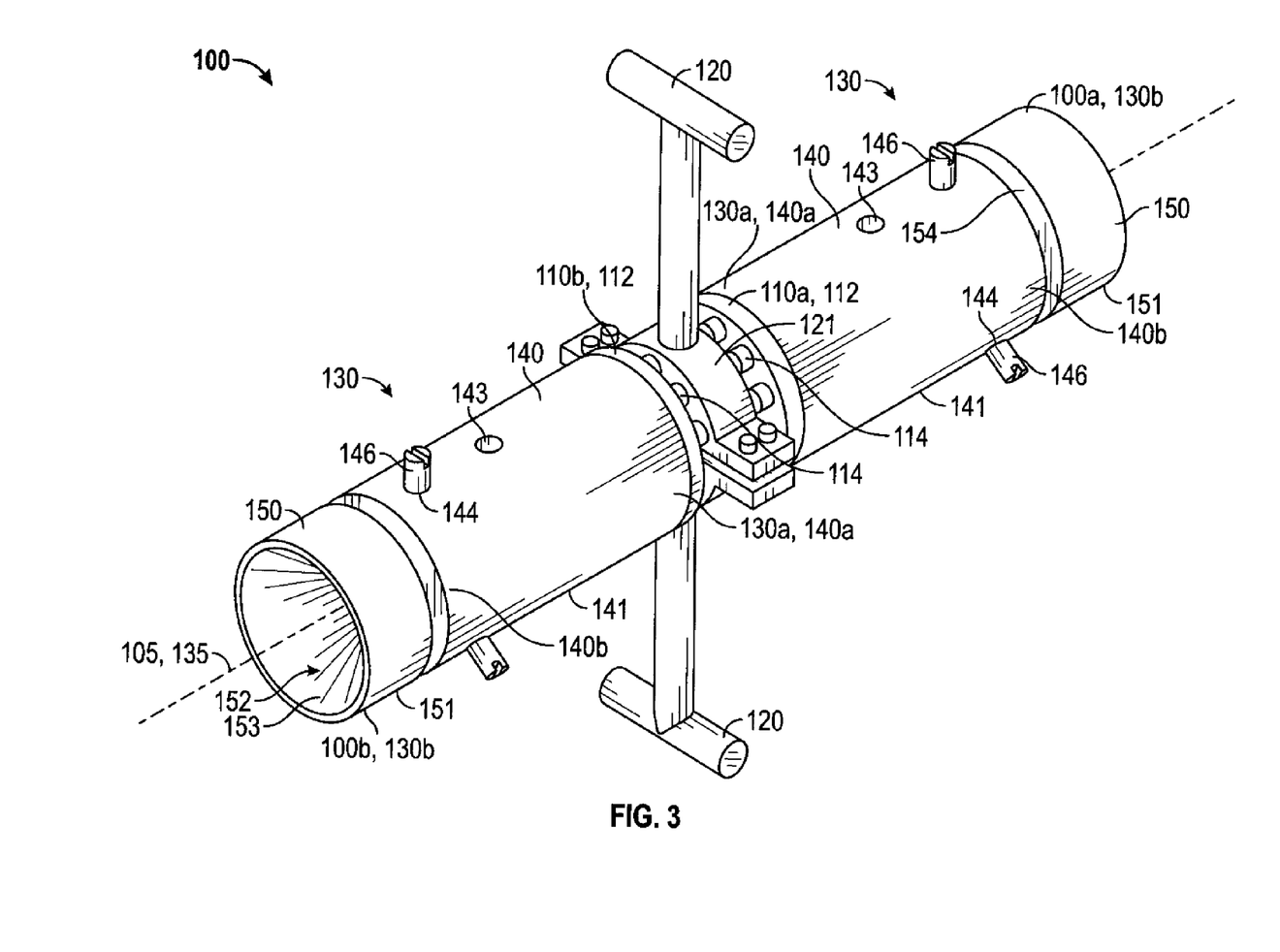
FIG. 3 is a perspective view of an embodiment of a tool in accordance with the principles described herein for connecting two hoses subsea.
Figure 4:
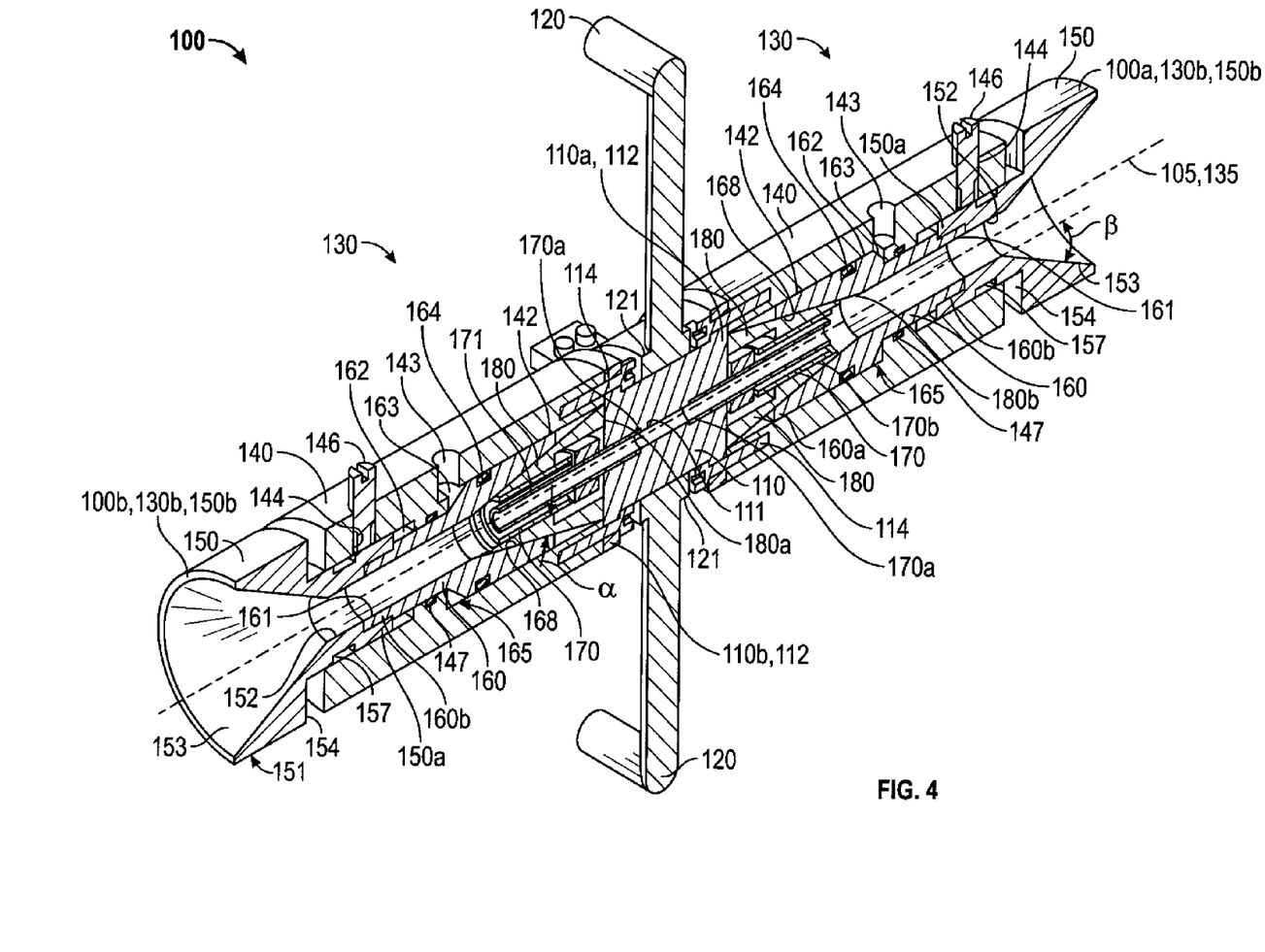
FIG. 4 is a cross-sectional view of the tool of FIG. 3 as viewed in a vertical plane containing the central axis of the tool of FIG. 3.

Referring now to FIGS. 3 and 4, an embodiment of a tool or device 100 to facilitate the connection of two subsea hoses or conduits is shown. Tool 100 has a central or longitudinal axis 105, a first end 100a, and a second end 100b opposite end 100a. In this embodiment, tool 100 includes a central mandrel 110, a pair of handles 120 mounted to mandrel 110, and a pair of hose attachment assemblies 130 coupled to mandrel 110. As will be described in more detail below, two hoses or conduits are spliced together with tool 100 by releasably engaging the end of one hose with each assembly 130.

As best shown in FIG. 4, mandrel 110 is coaxially disposed within tool 100 and includes a first end 110a, a second end 110b opposite first end 110a, and a through bore 111 extending axially between ends 110a, b. Each end 110a, b comprises an annular flange 112 that is secured to one assembly 130 with a plurality of circumferentially spaced bolts 114. Bore 111 includes internal threads at each end 110a, b.

Referring again to FIGS. 3 and 4, handles 120 extend radially outward from mandrel 110 and are mounted thereto with semi-circular mounting brackets 121. In particular, mounting brackets 121 are disposed about the cylindrical outer surface of mandrel 110 and are bolted together. In this embodiment, two handles 120 circumferentially spaced 180° apart are provided, however, in other embodiments, any suitable number of handles circumferentially spaced as desired may be provided. During subsea deployment and installation of tool 100, handles 120 are grasped by one or more subsea remotely operate vehicles (ROVs) and used by the ROVs to manipulate and position tool 100. Although each handle 120 is a T-handle in this embodiment, in other embodiments, the handles (e.g., handles 120) may comprise other geometries.

Referring still to FIGS. 3 and 4, hose attachment assemblies 130 extend axially from mandrel 110. More specifically, one assembly 130 extends axially from end 110a of mandrel 110 and the other assembly 130 extends axially from the opposite end 110b of mandrel 110. Each hose attachment assembly 130 is configured to releasably receive, engage, and secure the end of a hose or conduit. In this embodiment, hose attachment assemblies 130 are identical, and thus, only one assembly 130 will be described in detail, it being understood the other hose attachment assembly 130 is configured the same.

Hose attachment assembly 130 has a central or longitudinal axis 135 coaxially aligned with axis 105, a first or fixed end 130a secured to flange 112 with bolts 114, and a second or free end 130b distal mandrel 110. In addition, assembly 130 includes a radially outer tubular body or housing 140, a guide member 150 extending from housing 140 at end 130b, an annular piston 160 coupled to guide member 150 and slidably disposed within housing 140, a hose end fitting 170 disposed within housing 140 and coupled to mandrel 110 at end 130a, and a plurality of circumferentially spaced wedge members 180 radially positioned between piston 160 and end fitting 170. Housing 140, guide member 150, piston 160, and hose end fitting 170 are each coaxially aligned with axes 105, 135.

Referring still to FIGS. 3 and 4, housing 140 has a first end 140a bolted to flange 112 with bolts 114 previously described, a second end 140b opposite end 140a, a cylindrical outer surface 141, and a radially inner surface 142. A hydraulic port 143 and a plurality of circumferentially spaced locking pin receptacles 144 extend radially through housing 140 from outer surface 141 to inner surface 142. As will be described in more detail below, during subsea hose splicing operations, pressurized hydraulic fluid is supplied to port 143 to actuate piston 160. A locking pin 146 is moveably disposed within each receptacle 144 and is biased radially inward into engagement with guide member 150. In general, any biasing member or device known in the art (e.g., coil springs, clips, resilient elastic members such as rubber sleeves, etc.) may be used to bias locking pins 146 radially inward. In this embodiment, three uniformly circumferentially spaced receptacles 144 and corresponding locking pins 146 are provided. However, in other embodiments, a different number and/or spacing of receptacles and mating locking pins may be provided. As will be described in more detail below, locking pins 146 function to releasably lock guide member 150 and piston 160 relative to housing 140.

Inner surface 142 slidably engages guide member 150 and annular piston 160. In this embodiment, inner surface 142 includes an annular seal assembly 147 that sealingly engages piston 160. Seal assembly 147 includes an annular recess or seal gland in inner surface 142 and an annular seal member (e.g., O-ring seal) seated in the seal gland. The seal member forms an annular static seal with housing 140 and an annular dynamic seal with piston 160.

Referring still to FIGS. 3 and 4, guide member 150 has a first end 150a disposed within housing 140, a second end 150b external housing 140, a cylindrical outer surface 151, and a through passage 152 extending axially between ends 150a, b. Through passage 152 includes a tapered frustoconical guide surface 153 extending axially from end 150b. Annular surface 153 is oriented at a cone angle β relative to axes 105, 135. Angle β preferably ranges from 20° to 80°, and more preferably ranges from 30° to 70°.

Outer surface 151 includes an annular shoulder 154 that generally divides guide member 150 into a first portion that slidingly engages housing and a second portion axially adjacent end 140b of housing 140. The first portion of outer surface 151 has a smaller outer diameter than the second portion of outer surface 151. As best shown in FIG. 4, the first portion of outer surface 151 includes an annular groove or recess 157 on outer surface 152 configured to receive locking pins 146. More specifically, guide member 150 is actuated by piston 160 coupled thereto to move axially relative to housing 140. When recess 157 is not aligned with locking pins 146 (i.e., axially spaced apart from pins 146), pins 146 slidingly engage outer surface 152 of first portion 155. However, when recess 157 is moved into alignment with locking pins 146, pins 146 are biased radially inward into engagement with recess 157, thereby restricting and/or preventing guide member 150 and piston 160 from moving axially relative to housing 140. Prior to actuation of piston 160, recess 157 is not aligned with locking pins 146, however, once piston 160 is actuated and achieves its final axial position, the ends of locking pins 146 engage recess 157, thereby locking the axial position of guide member 150 and piston 160 coupled thereto.

Referring now to FIG. 4, annular piston 160 moves axially inside housing 140 and has a first end 160a proximal mandrel 110, a second end 160b connected to end 150a of guide member 150, a through passage 161 extending between ends 160a, b, and a radially outer surface 162. In this embodiment, ends 150a, 160b of guide member 150 and piston 160, respectively, are threaded together such that guide member 150 and piston 160 move axially together relative to housing 140, end fitting 170, and wedge members 180.

Outer surface 162 includes an annular frustoconical shoulder 163 and an annular seal assembly 164 that sealingly engages piston 160. Shoulder 163 of piston 160 and inner surface 142 of housing 140 define an annular hydraulic chamber 165 (where beveled shoulder 163 enables the hydraulic fluid to act on the piston face when it is in the fully refracted position) radially disposed between housing 140 and piston 160. Chamber 165 is in fluid communication with hydraulic port 143. Pressurized hydraulic fluid supplied to chamber 165 via port 143 acts on shoulder 163 to move piston 160 axially relative to housing 140, end fitting 170, and wedge members 180. Seal assembly 164 comprises an annular recess or gland in outer surface 162 and an annular seal member (e.g., O-ring seal) seated in the gland. The seal member forms an annular static seal with piston 160 and an annular dynamic seal with housing 140. Chamber 165 is axially positioned between seal assemblies 147, 164, and thus, seal assemblies 147, 164 function to restrict and/or prevent the leakage and loss of pressurized hydraulic fluid in chamber 165.

Through passage 161 includes a tapered frustoconical surface 168 extending axially from end 160a. Surface 168 slidingly engages mating tapered surfaces on wedge members 180. During axial movement of piston 160 relative to wedge members 180 via the supply of pressurized hydraulic fluid to chamber 165, surface 168 urges wedge members 180 radially inward to radially compress end fitting 170. Annular surface 168 is oriented at a cone angle α relative to axes, 105, 135.

Angle α preferably ranges from 30° to 60°. However, for a self-locking piston design, angle α is preferably ranges from 1° and 10°. In such self-locking designs, the piston (e.g., piston 160) is axially locked relative to housing (e.g., housing 140) without the need for locking pins (e.g., locking pins 146), and thus, the locking pins may be eliminated. In general, the smaller the angle α, the greater the stroke required for piston 160 to actuate wedge members 180 to create the radial clamping displacement described in more detail below, but the less force is required of piston 160.

Figure 5:
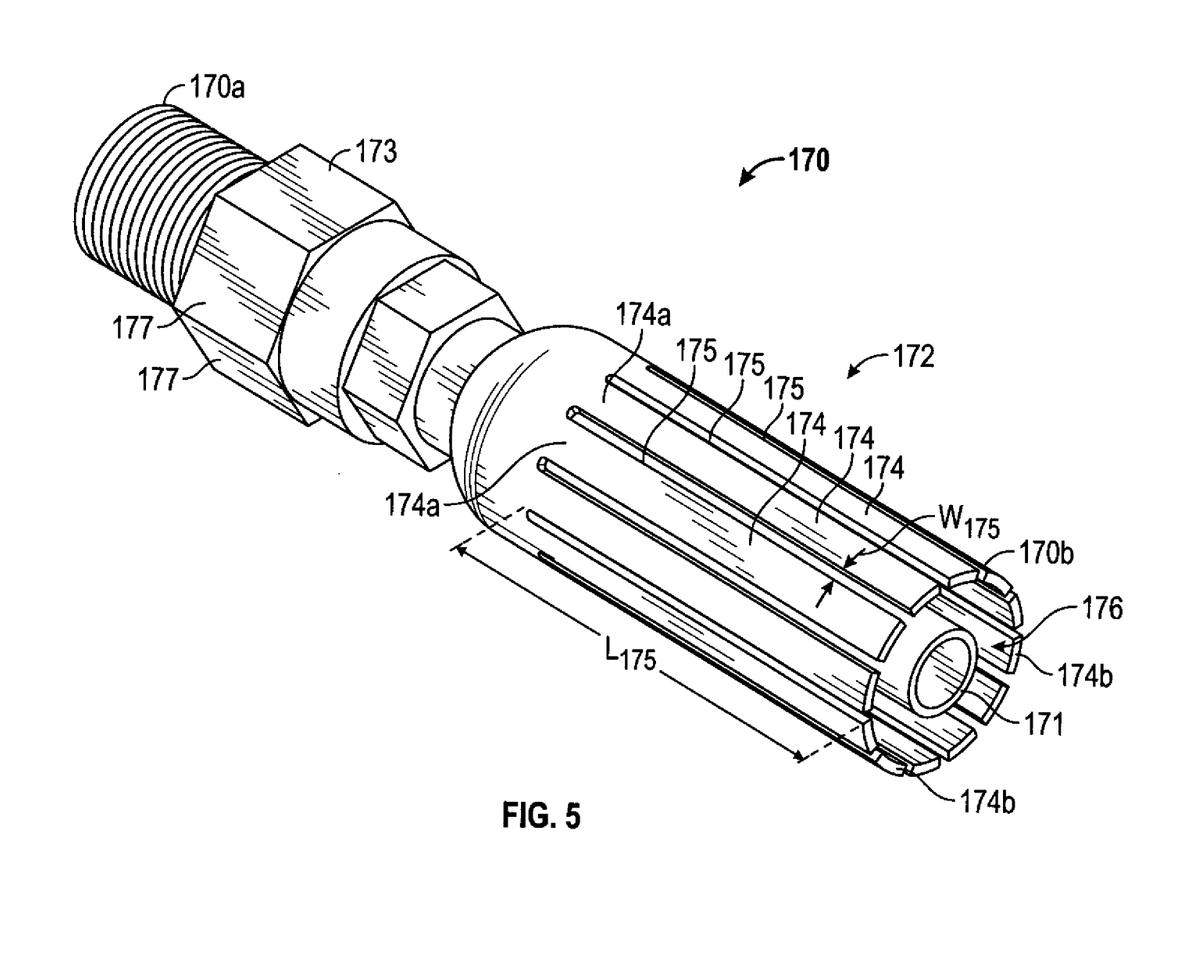
FIG. 5 is a perspective view of the hose end fitting of FIG. 4.

Referring now to FIGS. 4 and 5, hose end fitting 170 is positioned within wedge members 180 and has a first or fixed end 170a secured to mandrel 110 and a second or free end 170b distal mandrel 110. In this embodiment, end fitting 170 includes a rigid flow tube 171 extending axially between ends 170a, b, a shell 172 disposed about inner tube 171, and an annular polygonal member 173, for initially securing the fitting 170 to the body 110 mounted to tube 171 between ends 170a, b. Flow tube 171 has external threads at end 170a that mate and threadably engage internal threads in bore 111, thereby securing flow tube 171 and end fitting 170 to mandrel 110. As will be described in more detail below, flow tube 171 is stabbed into the hose secured by assembly 130, and thus, may also be referred to as a "stabbing member."

Shell 172 extends axially from end 170b and comprises a plurality of circumferentially spaced axially extending members 174, which can be referred to as "fingers" although there are no specific joints in them for bending about, disposed about tube 171. A slit or gap 175 is formed between each pair of circumferentially adjacent fingers 174. Each slit 175 has a circumferential width $W_{175}$. In addition, fingers 174 are radially spaced from tube 171, thereby forming an annulus 176 therebetween. Each finger 174 has a fixed end 174a coupled to tube 171 between ends 170a, b, a free end 174b at end 170b, and an axial length $L_{175}$ measured between ends 174a, b. As will be described in more detail below, wedge members 180 engage fingers 170 and function to flex fingers 174 radially inward towards tube 171 and into engagement with a hose disposed between tube 171 and fingers 174. In general, fingers 174 may be plastically deformed upon radial compression such that they do not expand radially outward upon release of the compressional loads by wedge members 180, or elastically deformed such that they resiliently expand radially outward upon release of the compressional loads by wedge members 180. Inclusion of slits 175 reduce the radial force necessary for wedge members 180 to radially compress shell 172.

Tightening member 173 is fixed to tube 171 between end 170a and shell 172 and includes a plurality of circumferentially adjacent planar surfaces 177 that are can be positively engaged and gripped to apply rotational torque to end fitting 170 to thread it into mandrel 110 during assembly of tool 100. In this embodiment, tightening member 173 is a hexagonal member that can be turned by a socket wrench for example.

Figure 6:
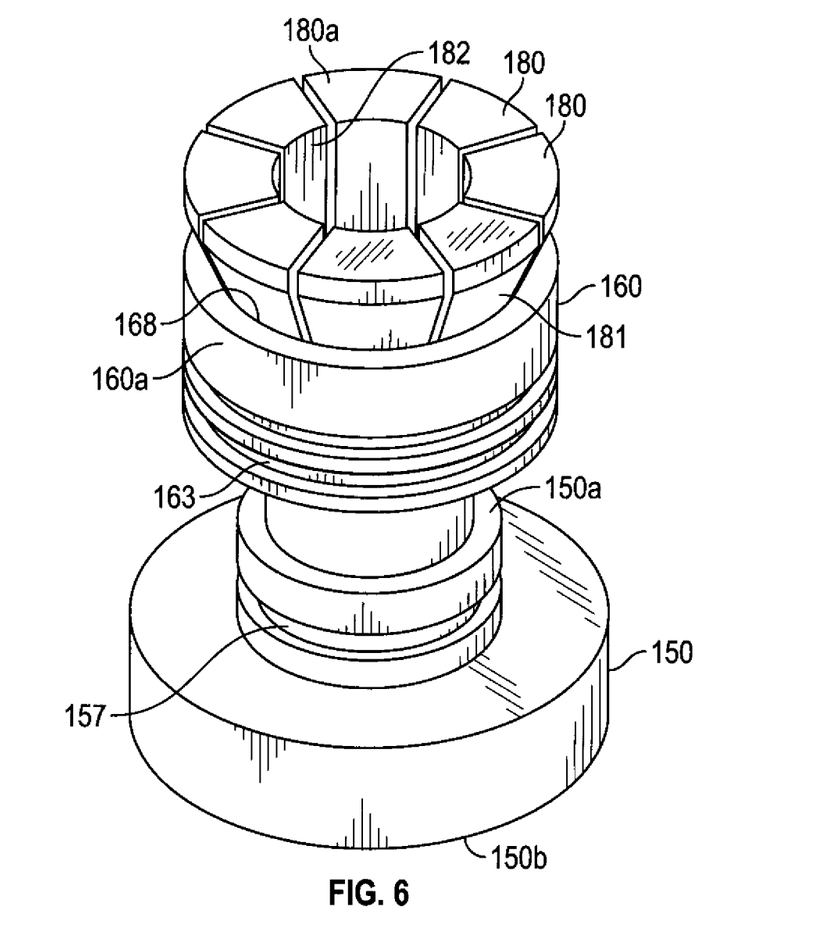
FIG. 6 is a perspective view of the guide member, the annular piston, and the wedges of the hose attachment assembly of FIG. 4.

Referring now to FIGS. 4 and 6, wedge members 180 are circumferentially arranged between piston 160 and hose end fitting 170. In this embodiment, each wedge member 180 is identical, and thus, only one wedge member 180 will be described in detail, it being understood the other wedge members 180 are configured the same. Wedge member 180 has a first end 180a that axially abuts mandrel 110, a second end 180b proximal end 170b of end fitting 170, a radially outer surface 181, and a radially inner surface 182. Outer surface 181 slidingly engages and mates with surface 168 of piston 160. Thus, outer surface 181 is a tapered, partial frustoconical surface contoured to surface 168 of piston 160 (i.e., surface 181 is oriented at the same angle α relative to axes 105, 135 as surface 168) Inner surface 182 of wedge member 180 includes a shoulder that divides surface 182 into a first generally cylindrical portion that engages fingers 174 and a second generally cylindrical portion that is radially spaced from tightening member 173, thereby providing radial clearance between inner surface 182 and tightening member 173 to allow wedge member 180 to be urged radially inward to radially compress and flex one or more corresponding fingers 174.

Wedge members 180 are sized and configured such that they are loosely fit around hose end fitting 170 prior to splicing operations. However, upon actuation of piston 160, wedge members 180 are urged radially inward, thereby causing wedge members 180 to be compressed radially and circumferentially together. The loose fit of wedge members 180 prior to actuation of piston 160 enables the hose to more easily stab member 171 and then upon actuation of the piston 160 provides circumferential clearance for wedge members 180 to be moved radially inward and circumferentially together upon actuation of piston 160. Although wedge members 180 are distinct and separate components from fingers 175 in this embodiment, in other embodiments, the wedge members (e.g., wedge members 180) may be integral with the fingers (e.g., fingers 175). For example, the wedge members may be monolithically formed with the fingers, or each wedge member and one or more fingers may be a single piece.

In general, the components of tool 100 may comprise any material suitable for subsea use including, without limitation, metals and metal alloys (e.g., stainless steel, aluminum, titanium, etc.), polymers (e.g., plastics), and composites. For most applications, mandrel 110, handles 120, housing 140, guide member 150, piston 160, and hose end fitting 170 are preferably made from a durable metal suitable for subsea use such as stainless steel (e.g., 316 or 17-4 stainless steel) or titanium. To reduce the potential for galvanic corrosion, mandrel 110, handles 120, housing 140, guide member 150, piston 160, and hose end fitting 170 preferably comprise the same metal. Wedge members 180 are preferably made from brass or bronze but may be made of other non-galling metals, as long as the Anodic Index (as defined in Roberge, P. R., *Handbook of Corrosion Engineering*, McGraw-Hill, 2000, ISBN 007-076516-2) between the metals comprising wedge members 180, piston 160, housing 140, guide member 150, and hose end fitting 170 is 0.15 or less for permanent subsea installations. A larger Anodic Index may be tolerated (e.g., up to 0.45) for temporary or emergency subsea operations.

Brass members 180 can be made by first making a brass cone having a cylindrical through bore to match the initial, unflexed, uncompressed outer diameter of shell 172 and an outer conical surface shaped to match inner surface 168 of piston 160, and then radially cutting the cone to yield the individual wedge members 180. Accordingly, wedge members 180 initially conform to fitting 170 and their outside radii of curvature is slightly smaller than that of frustoconical surface 168, and thus, a line contact is initially made along the length of wedge members 180. A circumferential groove (not shown here) around their outside surface for receiving a resilient band, such as an o-ring, can be used to hold them together to aid assembly.

Although assemblies 130 are identical in the embodiment of tool 100 shown in FIGS. 3 and 4, in other embodiments, the hose attachment assemblies (e.g., assemblies 130) may be different. For example, the hose attachment assemblies may be sized differently to enable the tool (e.g., tool 100) to connect two hoses having different diameters.

Figure 7A:
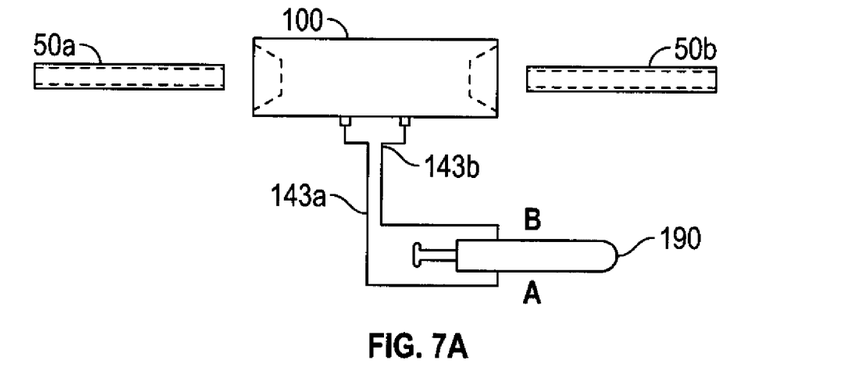
FIGS. 7A-7C are sequential schematic illustrations of an embodiment of a method in accordance with the principles described herein for connecting two hose segments subsea with the tool of FIG. 3.
Figure 7B:
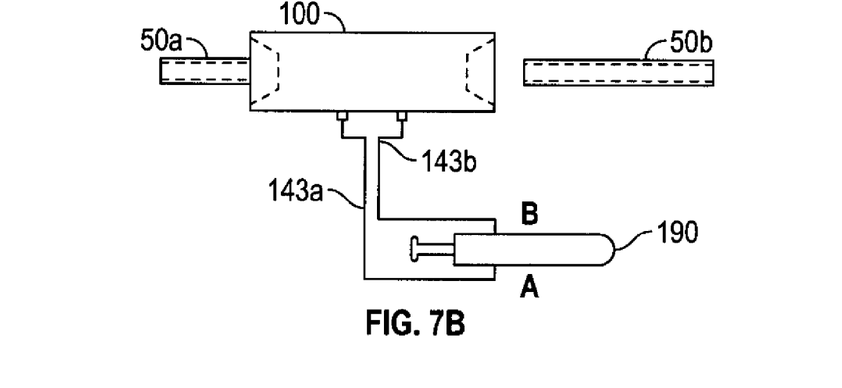
Figure 7C:
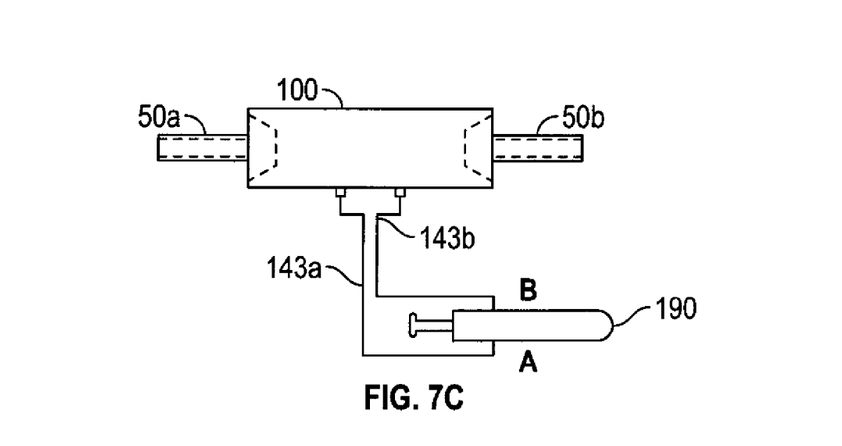

Referring now to FIGS. 7A-7C, tool 100 is schematically shown splicing or connecting a first subsea flexible hose segment 50a and a second subsea flexible hose segment 50b to allow fluid communication therebetween. The various steps described below and shown in FIGS. 7A-7C are preferably performed, supported, and/or facilitated by one or more subsea ROVs.

In this embodiment, each hydraulic port 143 is provided with a hydraulic line or hose 143a, b that is connected to one outlet A, B, respectively, of a conventional API 17H hot stab 190. Hot stab 190 is connected to an ROV for use of the ROV's hydraulic power system. Thus, in this embodiment, pressurized hydraulic fluid to operate tool 100 is provided via an ROV hydraulic power system, hot stab 190, and lines 143a, b. In other embodiments, the hydraulic lines (e.g., hydraulic lines 143a, b) may be connected to different hot stabs (e.g., different hot stabs 190), which in turn are connected to different ROV hydraulic power systems. In still other embodiments, hydraulic ports 143 may be connected to other sources of hydraulic power including, without limitation, hydraulic lines extending subsea from the surface.

Referring first to FIG. 7A, the ends of hose segments 50a, b are generally positioned proximal ends 100a, b, respectively, of tool 100. At this point, no hydraulic pressure is provided to ports 143, and thus, wedge members 180 are biased radially outward by resilient fingers 174 as pistons 160 are free to move axially away from mandrel 110 towards ends 140b of housing 140. In other words, fingers 174 are not compressed radially inward by wedge members 180.

Moving now to FIG. 7B, the end of hose segment 50a is inserted into passage 152 of guide member 150 and axially advanced through passages 152, 161 toward hose end fitting 170. Frustoconical guide surface 153 helps to guide the end of hose segment 50a as it is inserted into tool 100 and coaxially align the end of hose segment 50a with tool 100. Next, the end of hose segment 50a is axially advanced into end 170a of hose end fitting 170, which is sized to receive the end of hose segment 50a within fingers 174 as flow tube 171 simultaneously receives the end of hose segment 50a and then slides over flow tube 171. Thus, the tubular defining hose segment 50a is radially positioned between fingers 174 and flow tube 171. The end of hose segment 50a is preferably axially advanced beyond ends 174a of fingers 174. With the end of hose segment 50a sufficiently seated within end fitting 170, piston 160 is actuated by supplying hydraulic fluid pressure to chamber 165 via port 143, hydraulic line 143a, and hot stab 190. The increase in hydraulic fluid pressure within chamber 165 forces piston axially towards mandrel 110, thereby forcing wedge members 180 radially inward via sliding engagement of sloped surfaces 168, 181. The radially inward movement of wedge members 180 causes shell 172 and fingers 174 to flex radially inward, conform to the end of hose segment 50a, and radially compress the end of hose segment 50a into sealing engagement with flow tube 171. In addition, the radial compression of the end of hose segment 50a between fingers 173 and tube 171, as well as the frictional engagement therebetween, restricts and/or prevents hose segment 50a from sliding off tube 171 and decoupling from end fitting 170. Piston 160 is moved axially towards mandrel 110 until recess 157 comes into alignment with locking pins 146, and locking pins 146 are biased radially inward into recess 157, thereby restricting and/or preventing piston 160 from moving axially relative to housing 140 and wedges 170 when the hydraulic pressure in chamber 65 is relieved. This effectively secures and locks the end of hose segment 50a within hose end fitting 170. As wedge members 180 are maintained in place following deformation of shell 172, the end of hose segment 50a will also remain locked in place on flow tube 171 and a fluid tight hydraulic connection will be obtained, thereby offering the potential to resist and/or prevent leaks under high pressure.

Moving now to FIG. 7C, this process is repeated with hose segment 50*b* and the other assembly 150 to secure and lock the end of hose segment 50*b* into the corresponding hose end fitting 170. With the ends of hose segments 50*a, b* secured and sealed within corresponding end fittings 170, fluid communication is provided between segments 50*a, b* via flow tubes 171 and bore 111 of mandrel 110.

Referring now to FIGS. 8A-8D, an embodiment of a method for replacing a damaged or non-functional subsea hydraulic power source 10 with a new or repaired hydraulic power source 10' using tool 100 is schematically shown. In general, hydraulic system 20 may comprise any type of subsea hydraulically operated system or device. For example, system 20 may be a BOP, pump, manifold, a transfer pipeline, a lower marine riser package (LMRP), a lower riser assembly (LRA), an upper riser assembly (URA), or the like. The various steps described below and shown in FIGS. 8A-8D are preferably performed, supported, and/or facilitated by one or more subsea ROVs.

Figure 8A:
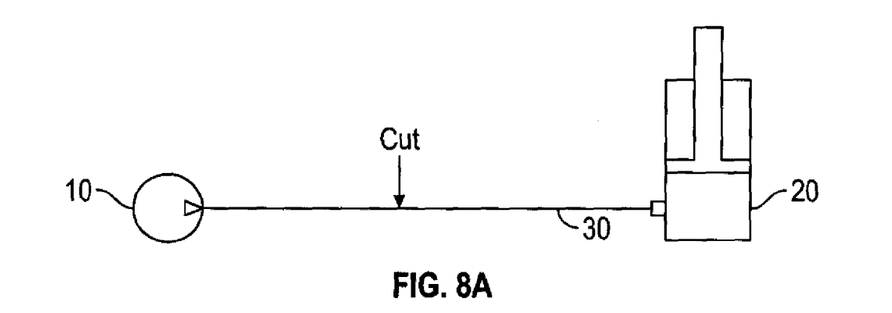
FIGS. 8A-8D are sequential schematic illustrations of an embodiment of a method in accordance with the principles described herein for connecting hose segments of a subsea hydraulic power source and a subsea hydraulic system with the tool of FIG. 3.
Figure 8B:
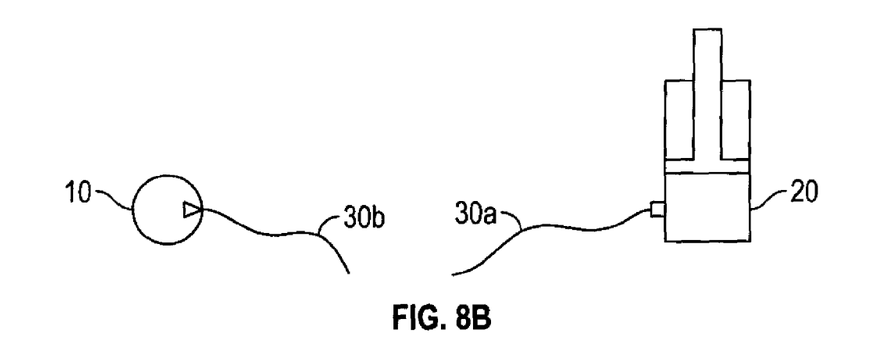
Figure 8C:
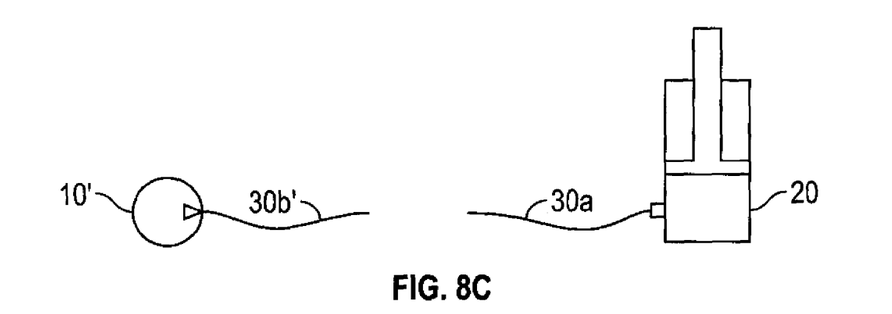
Figure 8D:
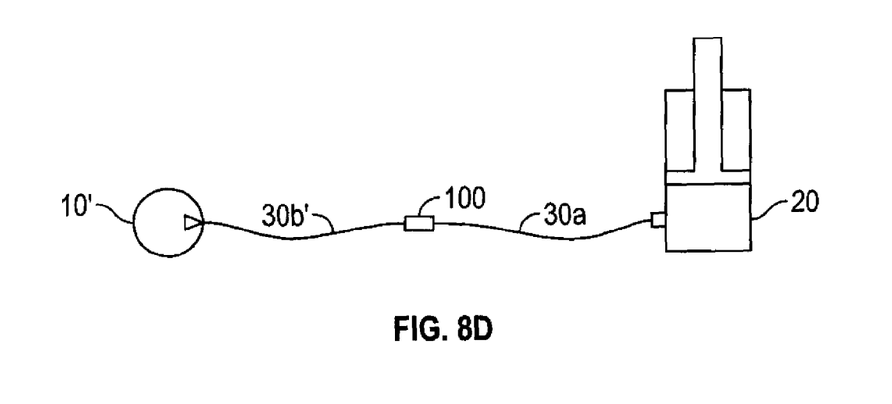

As shown in FIGS. 8A and 8B, subsea hydraulic power source 10 is disconnected from a subsea hydraulically operated system 20 by cutting the hydraulic supply hose 30 extending therebetween with a subsea ROV, leaving a first hose segment 30*a* connected to hydraulic system 20 and a second hose segment 30*b* connected to power source 10. Hose 30 is preferably cut such that the ends of hose segments 30*a, b* are substantially perpendicular to the longitudinal axis of segments 30*a, b*, respectively. If power source 10 is to be repaired and redeployed, it is retrieved to the surface for repair. However, if non-functional power source 10 is to be replaced, it can be retrieved to the surface or left subsea. The repaired or new hydraulic power source 10', including a hose segment 30*b*' extending therefrom, is lowered and installed subsea as shown in FIG. 8C. Moving now to FIG. 8D, tool 100 is employed to connect the ends of hose segments 30*a*, 30*b*' in the same manner as previously described with respect to FIGS. 7A-7C, thereby fluidly connecting power source 10' and hydraulic system 20.

As previously described, the conventional approach to connecting subsea hydraulic hoses shown in FIGS. 1A-1C requires removal of the hose segment 30*a* connected to hydraulic system 20 and installation of a new hose segment 30*a*' onto hydraulic system 20. However, embodiments described herein eliminate these steps, thereby offering the potential for reduced down time.

In certain methods described herein, one or more remotely operated vehicles (ROVs) are preferably employed to aid in positioning, manipulating, actuating, connecting, and disconnecting various subsea systems and components. However, the disclosure is not limited to use of ROVs, as autonomous underwater vehicles (AUVs), unmanned undersea vehicles (UUVs) manned underwater vehicles, or combinations thereof may be employed in certain embodiments. Moreover, although embodiments described herein may be used in any marine environment by human divers and/or underwater vehicles, they are particularly useful in deep and ultra-deep water environments where human diving is presently impossible.

Although embodiments of systems, devices, and methods described herein are described in the context of connecting and splicing subsea hoses (e.g., hydraulic hoses), in general, embodiments described herein may be used to splice or connect any type of hose or conduit subsea or otherwise. For example, embodiments disclosed herein may be employed to establish a new ad hoc subsea connection, repair a damaged subsea connection (e.g., a damaged umbilical extending subsea from a surface vessel to a subsea device), or replace a malfunctioning subsea hydraulic power unit. Still further, although the embodiment of tool 100 shown in FIGS. 3 and 4 includes two hose attachment assemblies 130 (i.e., tool 100 is "double-sided"), in other embodiments, the tool (e.g., tool 100) may include only one hose attachment assembly (e.g., assembly 130). For example, a single-sided tool (e.g., tool 100 including only one hose attachment assembly) can be used to cap or close off a subsea hose or conduit that is no longer needed. In such cases, the bore in the mandrel (e.g., bore 111 in mandrel 110) and/or the through bore in the flow tube (e.g., bore extending axially through flow tube 171) can be eliminated to restrict and/or prevent fluid communication therethrough in order to cap the subsea hose or conduit. As another example, a single sided tool can be used to connect a subsea hose or conduit to another device coupled to the tool by a means other than a hose attachment assembly such as a conventional hydraulic hose connector or fitting. Hence, when the damaged power source is repaired at the surface or a new power source is deployed subsea, the hose connected to the repaired/new power source can already be attached to the hose splicing tool with a simple low cost standard connection, and then a subsea ROV need only couple the tool the hose segment extending from the subsea hydraulic system.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

All U.S. published patent applications and U.S. Patents referenced herein are hereby explicitly incorporated herein by reference in their entirety for all purposes. In the event definitions of terms in the referenced patents and applications conflict with how those terms are defined in the present application, the definitions for those terms that are provided herein shall be deemed controlling.

To further illustrate various illustrative embodiments of the present invention, the following example is provided.

EXAMPLE

To determine specific dimensions for the wedge members (e.g., wedge members 180), the outer shell of the hose end fitting (e.g., outer shell 172), and the annular piston (e.g., piston 160), a physical prototype was built and tested with actual hose segments to determine the axial force required to obtain the appropriate radial compression of the wedge members and the outer shell to prevent leaks from the hose segment. Based on the axial force determinations, specific dimensions of the components were calculated for three different hose sizes—0.5, 1.0, and 1.5. The results of those calculations are shown in Table 1 below. Clearances between members and tolerances on dimensions are set in accordance with standard machining tolerances required for hydraulic systems, including accommodating displacements created by high pressure hydraulic fluid acting on thin wall cylindrical members.

TABLE 1

| | Hose Size | | |
|---|---|---|---|
| | 0.5 | 1.0 | 1.5 |
| Hose outer diameter (in.) | 0.84 | 1.4 | 2.25 |
| Hose inner diameter (in.) | 0.5 | 1.0 | 1.5 |
| Hose end fitting outer shell uncrimped outer diameter (in.) | 1.125 | 1.8 | 2.9 |
| Hose end fitting outer shell crimped outer diameter (in.) | 0.97 | 1.54 | 2.45 |
| Diametral compression of hose end fitting outer shell (in.) | 0.155 | 0.26 | 0.45 |
| Number of slits in hose end fitting outer shell | 8 | 8 | 12 |
| Minimum width of each slit in hose end fitting outer shell (in.) | 0.061 | 0.102 | 0.118 |
| Housing outer diameter (in.) | 3.25 | 4 | 5 |
| Piston outer diameter (in.) | 2.5 | 3.5 | 4.5 |
| Piston axial travel distance (in.) | 0.75 | 1 | 1.25 |
| Taper angle of each wedge member | 13 | 14 | 20 |

What is claimed is:

1. A hose connection system comprising:
a body including an internal cavity and a port in fluid communication with a portion of the internal cavity;
a hose end fitting positioned in the cavity, wherein the hose end fitting includes an inner tubular member configured to be stabbed into an end of a first hose and an outer tubular member concentrically disposed about the inner tubular member and configured to be disposed about the end of the first hose, wherein the outer tubular member includes a plurality of circumferentially spaced axial slits;
a plurality of wedge members arranged circumferentially about the outer tubular member;
an annular piston movably disposed within the internal cavity of the body;
wherein an end of the piston has an inner frustoconical surface that slidingly engages the plurality of wedge members;
wherein the piston is configured to move axially through the body and compress the wedge members and the outer tubular member radially inward to engage and lock in place the end of the first hose about the inner tubular member in response to hydraulic pressure in the port.

2. The hose connection system of claim 1, further comprising a guide member connected to the annular piston, the guide member having an end including a frustoconical inner surface configured to receive and guide the end of the first hose.

3. The hose connection system of claim 1, further comprising a locking member extending radially through the body and configured to engage a recess in the guide member to lock the position of the piston within the body.

4. The hose connection system of claim 1, further comprising:
a second body including an internal cavity and a port in fluid communication with the internal cavity, wherein the second body is coupled to the first body;
a second hose end fitting positioned in the cavity, wherein the second hose end fitting includes an inner tubular member configured to be stabbed into an end of a second hose and an outer tubular member concentrically disposed about the inner tubular member and configured to be disposed about the end of the second hose, wherein the outer tubular member of the second hose end fitting includes a plurality of circumferentially spaced axial slits;
a second plurality of wedge members arranged circumferentially about the outer tubular member of the second hose end fitting;
a second annular piston movably disposed within the internal cavity of the second body;
wherein an end of the second piston has an inner frustoconical surface that slidingly engages the plurality of wedge members;
wherein the second piston is configured to move axially through the second body and compress the second plurality of wedge members and the outer tubular of the second hose end fitting radially inward to engage and lock in place the end of the second hose about the inner tubular member in response to hydraulic pressure in the port of the second body.

5. A tool for connecting to a hose or conduit, comprising:
a housing having a central axis, a first end, a second end opposite the first end, a radially outer surface, and a radially inner surface, wherein the housing includes a port extending radially through the housing from the outer surface to the inner surface;
a guide member having a first end disposed within the housing, a second end opposite the first end, and a through passage extending axially from the first end of the guide member to the second end of the guide member;
an annular piston slidably disposed within the housing, wherein the piston has a first end, a second end coupled to the first end of the guide member, a radially outer surface, and a through passage extending axially from the first end of the piston to the second end of the piston, wherein the through passage of the piston includes a frustoconical surface extending axially from the first end of the piston, and wherein the through passage of the piston is in fluid communication with the through passage of the guide member;
an annular chamber within the housing in fluid communication with the port;
a hose end fitting disposed within the housing, wherein the first hose end fitting includes a stabbing member and a shell disposed about the stabbing member; and
a plurality of circumferentially spaced wedge members positioned between the housing and the shell of the hose end fitting, wherein each wedge member has a radially outer surface that mates and slidably engages the frustoconical surface of the piston.

6. The tool of claim 5, wherein the piston is configured to move axially within the housing in response to a pressure increase in the chamber.

7. The tool of claim 5, wherein the shell of the hose end fitting comprises a plurality of circumferentially spaced axially extending members, and wherein the first plurality of wedge members are configured to compress the free ends of the axially extending members radially inward.

8. The tool of claim 5, wherein the frustoconical surface of the piston is oriented at a cone angle $\alpha$ relative to the central axis of the housing, wherein the cone angle $\alpha$ is between 30° and 60';
wherein through passage of the guide member includes a frustoconical surface extending axially from the second end of the guide member, wherein the frustoconical surface of the guide member is oriented at a cone angle β relative to the central axis of the housing, wherein the cone angle β is between 20° and 80°.

9. The tool of claim 5, further comprising:
a locking pin disposed within a pin receptacle in the housing, wherein the locking pin is biased radially inward;
an annular recess in the outer surface of the guide member, the recess configured to receive the locking pin.

10. The tool of claim 5, further comprising a mandrel having a central axis, a first end coupled to the housing, and a second end opposite the first end.

11. The tool of claim 10, wherein each wedge member axially abuts the first end of the mandrel.

12. The tool of claim 5, wherein the wedge members are distinct and separate from the shell of the hose end fitting and slidingly engage the shell of the hose end fitting.

13. A system for connecting two hoses or conduits, the tool comprising:
a mandrel having a central axis, a first end, a second end opposite the first end, and a through bore extending axially from the first end to the second end;
a first hose attachment assembly mounted to the first end of the mandrel; and
a second hose attachment assembly mounted to the second end of the mandrel;
wherein each hose attachment assembly includes:
a housing having a first end, a second end opposite the first end, and a port extending radially through the housing;
a guide member moveably coupled to the housing, wherein the guide member has a first end, a second end opposite the first end, and a through passage extending axially from the first end of the guide member to the second end of the guide member;
an annular piston slidably within the housing, wherein the piston has a first end, a second end coupled to the guide member, an outer surface, and a through passage extending axially from the first end of the piston to the second end of the piston, wherein the through passage of the piston includes an annular tapered surface extending axially from the first end of the piston, and wherein the through passage of the piston is in fluid communication with the through passage of the guide member and the through bore of the mandrel;
a hydraulic chamber positioned between the housing and the piston, the hydraulic chamber in fluid communication with the port;
a hose end fitting disposed within the housing, wherein the hose end fitting has a first end coupled to the first end of the mandrel and a second end disposed within the piston, and wherein the hose end fitting includes a flow tube member and an annular shell disposed about the flow tube; and
a plurality of circumferentially spaced wedge members radially disposed between the shell and the piston, wherein each wedge member has an outer surface that slidably engages the tapered surface of the piston and an inner surface that engages the shell.

14. The system of claim 13, wherein each flow tube is in fluid communication with the through bore of the mandrel.

15. The system of claim 13, wherein each piston is configured to move axially towards the mandrel in response to a pressure increase in the corresponding hydraulic chamber.

16. The system of claim 15, wherein the shell of each hose end fitting comprises a plurality of circumferentially spaced axially extending members, wherein each plurality of wedge members is configured to compress the free ends of the corresponding axially extending members radially inward in response to the axial movement of the corresponding piston.

17. The system of claim 13, wherein the tapered surface of each piston is oriented at a cone angle α relative to the central axis of the mandrel, wherein the cone angle α is between 30° and 60';
wherein through passage of each guide member includes a frustoconical surface extending axially from the second end of the guide member, wherein the frustoconical surface of each guide member is oriented at a cone angle β relative to the central axis of the mandrel that is between 20° and 80°.

18. The system of claim 13, further comprising:
a first locking pin disposed within a pin receptacle in the housing of the first hose attachment assembly and a second locking pin disposed within a pin receptacle in the housing of the second hose attachment assembly, wherein each locking pin is biased radially inward;
a first recess in the outer surface of the guide member of the first hose attachment assembly, the first recess configured to receive the first locking pin;
a second recess in the outer surface of the guide member of the second hose attachment assembly, the second recess configured to receive the second locking pin.

19. The system of claim 13, further comprising:
a first hydraulic line coupled to the port of the first hose attachment assembly and configured to supply hydraulic pressure to the chamber of the first hose attachment assembly; and
a second hydraulic line coupled to the port of the second hose attachment assembly and configured to supply hydraulic pressure to the chamber of the second hose attachment assembly.

* * * * *